Nov. 1, 1938.  R. H. MITCHELL ET AL  2,135,192
DISK MOUNTING
Filed Nov. 26, 1937   2 Sheets-Sheet 1
Fig. 4.
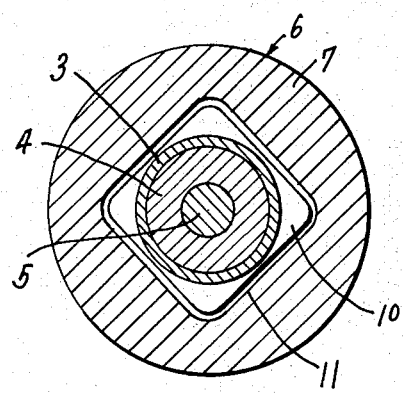
Fig. 1.
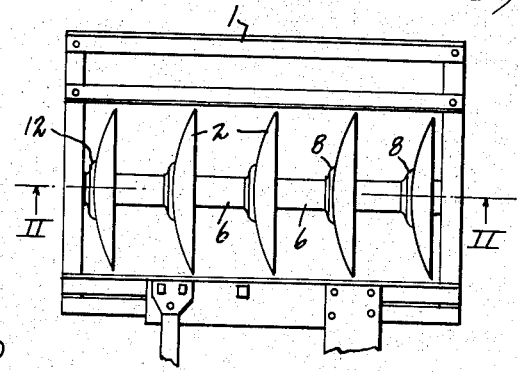
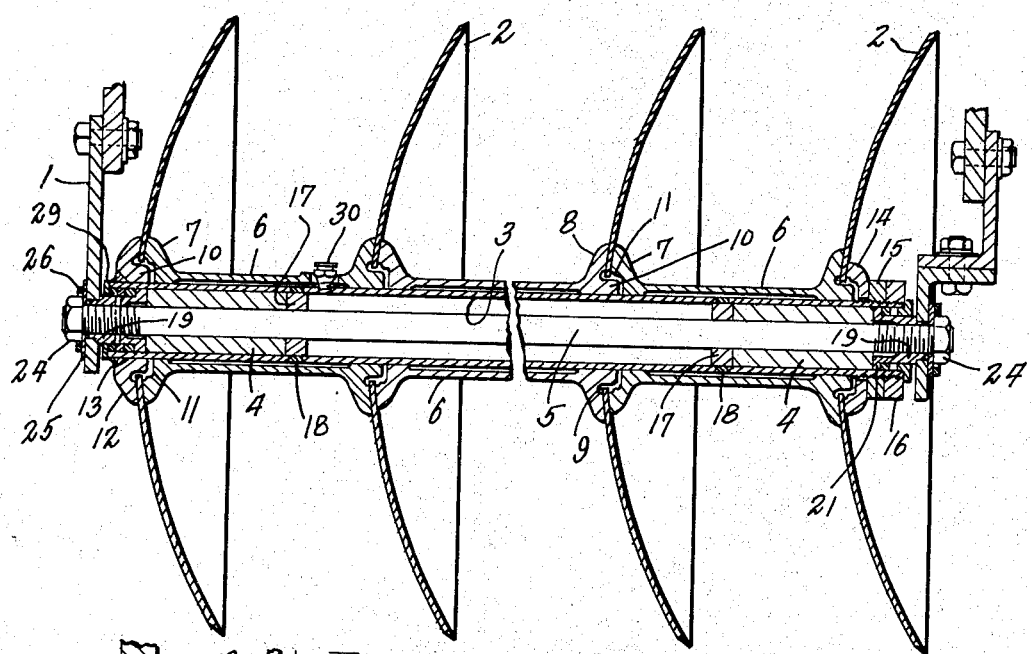
Fig. 2.
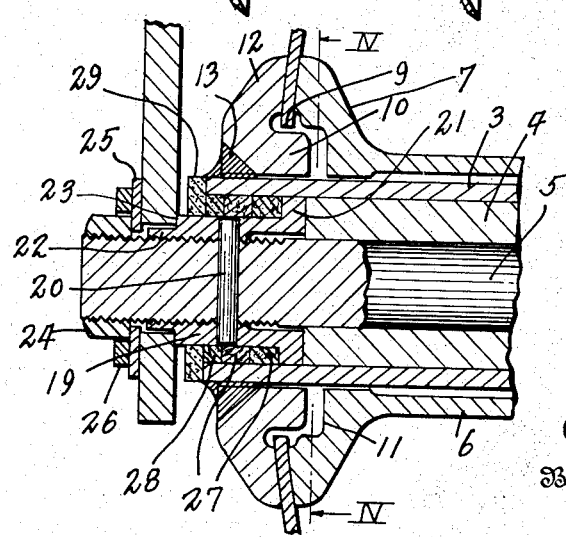
Fig. 3.
Inventors
Rollie H. Mitchell
Oscar W. Sjogren
Edwin F. Wadelton
By Lyon & Lyon
Attorneys

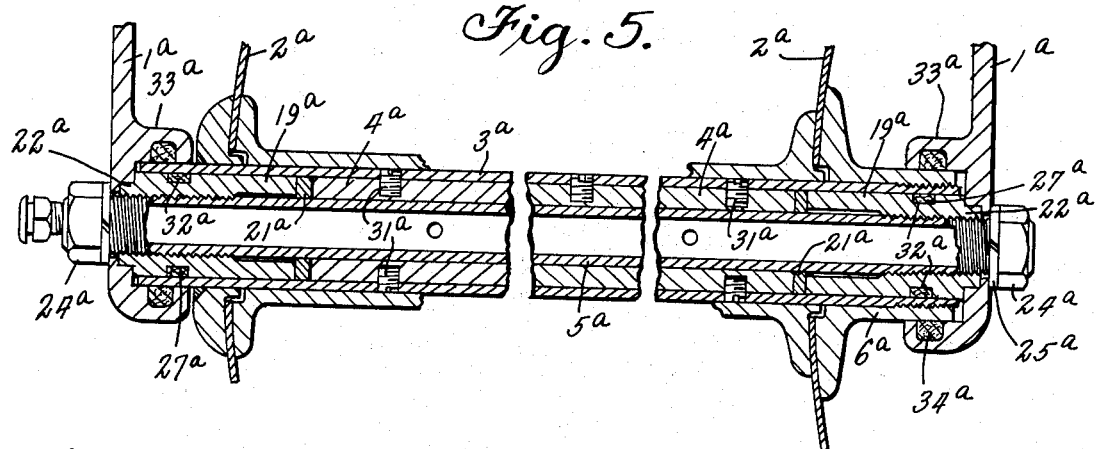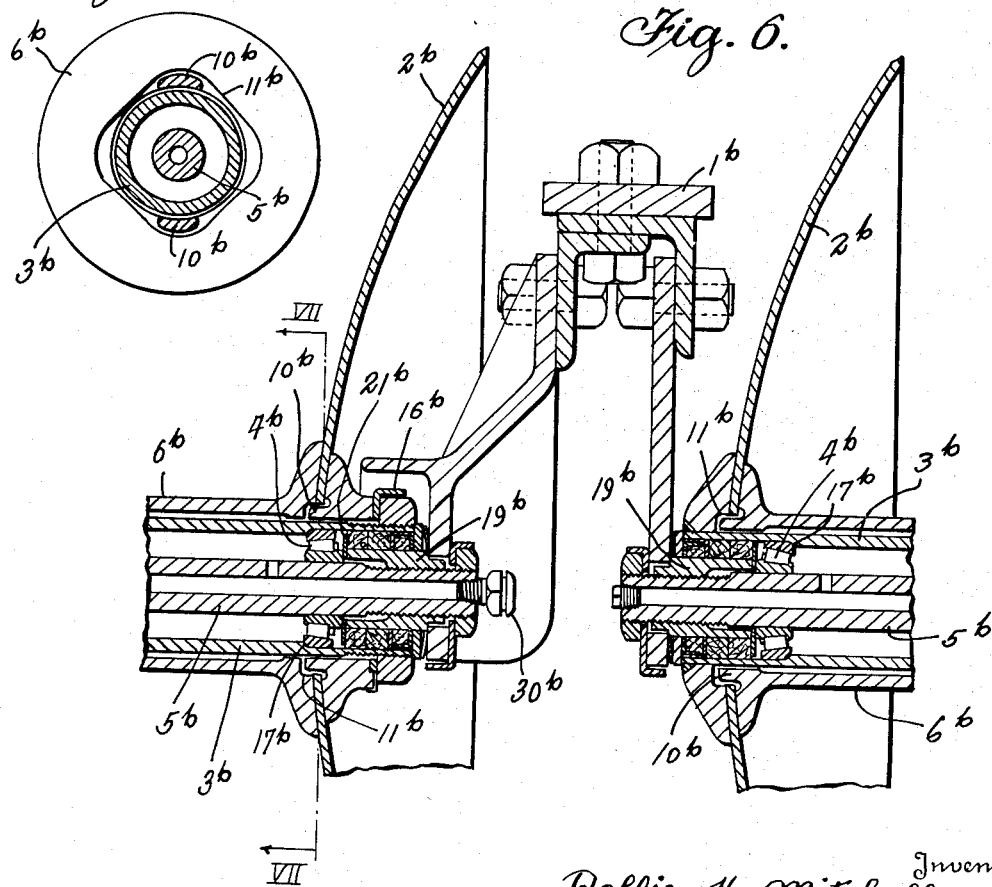

Patented Nov. 1, 1938

2,135,192

UNITED STATES PATENT OFFICE 2,135,192

DISK MOUNTING

Rollie H. Mitchell and Oscar W. Sjogren, Huntington Park, and Edwin F. Wadelton, Los Angeles, Calif., assignors to Killefer Manufacturing Corporation, Los Angeles, Calif., a corporation of California Application November 26, 1937, Serial No. 176,564

8 Claims. (Cl. 97—220)

This invention relates to disk mounting, and more particularly to the mounting of the disk blades in the frames of a disk harrow or like implement, so that the disks are supported upon tubular shafts journaled by an improved bearing means upon a fixed shaft or axle secured to the frame structure.

It is an object of this invention to provide an improved form of mounting for ground working implements in a frame whereby the ground working implements are supported upon an improved form of bearing means which is of simple construction and permits of the free running or rotation of the ground working implements, and wherein the bearing means provided are enclosed within a lubricant-containing, dust-proof housing.

Another object of this invention is to provide an improved form of mounting for the concavo-convex disks of a disk harrow wherein the disk gangs are supported in spaced relation upon a tubular shaft, which shaft provides a housing for enclosing the bearing means whereby the tubular shaft is rotatably supported with relation to a fixed axle or shaft.

Other objects and advantages of this invention it is believed will be apparent from the following detailed description of a preferred embodiment thereof as illustrated in the accompanying drawings.

In the drawings:

Figure 1 is a diagrammatic plan view of a single frame of a disk harrow.

Figure 2 is a sectional elevation taken substantially upon the line 2—2 of Figure 1.

Figure 3 is an enlarged fragmental elevation of the left end of the structure as illustrated in Figure 2.

Figure 4 is a sectional view taken substantially on the line 4—4 of Figure 3.

Figure 5 is a sectional view similar to Figure 2 of the modified form of construction embodying our invention.

Figure 6 is a sectional view of a third modified form of the disk mounting embodying our invention.

Figure 7 is an end sectional view taken substantially on the line 7—7 of Figure 6.

In the drawings 1 indicates a frame which may be of any suitable or desirable construction within which ground working elements such, for example, as concavo-convex disks 2 are supported. The elements 2 are supported in spaced relation along a tubular shaft 3, which tubular shaft 3 is journaled by spaced bearings 4 upon a rigid stationary shaft 5. The elements 2 are maintained in spaced relation upon the tubular shaft 3 by means of spacers 6, which spacers 6 are formed with complementary interfitting ends 7 and 8 between which the elements 2 are held. The elements 2 are formed as illustrated with square openings 9 into which the square 10 of the end 8 passes in order to cause the elements 2 to rotate together with the tubular shaft 3. The square 10 fits into a corresponding square opening 11 formed in the ends 7.

An end collar 12 is secured to the tubular shaft 3 by any suitable or desirable means such, for example, as by welding the same in position as indicated at 13. The collar 12 is formed in substantially the same manner as the end 8 of one of the spacers 6. A collar 14 is mounted upon the tubular shaft 3 at the opposite end, and is held in position by means of a clamping nut 15 which is threaded to the tubular shaft 3 and locked in clamping position by means of a lock nut 16. Positioned within the tubular shaft 3 around the rigid shaft 5 are annular bearing stops 17 which are held in position by means of spot welding the same to the tubular shaft 3 as indicated at 18.

Positioned adjacent the bearing stops 17 are the sleeve bearings 4 which are held in position of adjustment by means of the bearing adjustment collars 19 which are threaded to the rigid shaft 5 and held in position of adjustment by means of lock pins 20 which are passed through the collars 19 and rigid shaft 5. The adjustment collars 19 are fitted within the tubular shaft 3 and provide annular thrust rings 21 in engagement with the ends of the sleeve bearings 4 for transmitting the end thrust imposed along the sleeve bearings 4 from the bearing stops 17 to the frame 1.

The collars 19 are provided with a reduced polygonal section 22 which fits into openings formed in the frame 1 and the shoulders 23 thus provided at the end of this reduced polygonal section are held clamped to the frame 1 by means of nuts 24 threaded to the rigid shaft 5 and held locked thereto by means of a washer 25 and nut lock 26. The end thrust transmitted as in the modification described is transmitted only to the frame at the left side of the assembly as viewed in Figure 2.

On the opposite end the assemblage of parts as previously described is the same but merely provides for maintaining the parts in proper adjustment along the rigid shaft 4.

In order to provide for a dust-proof assembly and for the retention of lubricant within the tubular shaft 3, the collars 19 are fitted with lubricant-retaining means which include felt grease retainers 27 which are mounted upon the collars 19 adjacent to the annular thrust rings 21. These felt retainers are maintained in position by means of an inside leather seal ring 28 which is fitted within the tubular shaft 3 and an outside leather retaining seal ring 29 which is fitted upon a collar 19 at the end of the tubular shaft 3. In order that the inside of the tubular shaft may receive or may be substantially filled with lubricant, if desired, a grease fitting 30 is provided.

In the modified form of construction illustrated in Figure 5, similar parts are indicated with similar numerals with the addition of an exponent "a" thereto. In this modified form of our invention the structure is indicated as broken away lengthwise of the tubular shaft $3^a$ and includes three spaced bearing sleeves $4^a$ which are in this modification secured to the tubular shaft $3^a$ by means of screws $31^a$ so that the bearing sleeves rotate with the tubular shaft $3^a$. The rigid shaft $5^a$ may also be of tubular construction, as indicated. Mounted within the tubular shaft $3^a$ are end thrust bearing rings $21^a$ which engage the ends of the outer sleeve bearings $4^a$ and are held in position by means of the bearing adjustment collars $19^a$ which fit within the tubular shaft $3^a$ and are threaded to the rigid shaft $5^a$. In this modification the collars $19^a$ are provided with annular packing recesses $32^a$ into which packing felt $27^a$ is fitted. The rigid shaft is secured to the frame $1^a$ by means of nuts $24^a$ which are threaded to the opposed ends of the shaft $5^a$ held in position by means of lock washers $25^a$. The frame member $1^a$ in this case is formed with an annular boss $33^a$ drilled to receive the end spacing collar $6^a$ which is packed to the annular boss by means of packing $34^a$ in order to provide for a dust-proof grease retaining housing for the bearings $4^a$ and $21^a$.

The collars $19^a$ are provided with the reduced polygonal section $22^a$ which fits within the corresponding polygonal recess formed in the frame member $1^a$. As in the previous case, this modification of our invention is provided with means whereby the interior of the shaft $3^a$ may be packed with grease, if desired.

In the modification of our invention, as illustrated in Figure 6, similar parts are indicated with similar numerals with the addition of an exponent "b" thereto. This modification of our invention differs from those heretofore set forth principally in that it includes or utilizes radial and end thrust roller bearings $4^b$ in the place of the radial and end thrust bearings as set forth in connection with the previous modifications of our invention. The radial and end thrust bearings in this modification are fitted upon the rigid shaft $5^b$ at the respective ends of the assembly and engage shoulders $17^b$ formed from the interior periphery of the tubular shaft $3^b$ and end thrust washers $21^b$ are interposed between the bearings $4^b$ and the bearing adjustment collars $19^b$. The assembly of spacers $6^b$ and disks $2^b$ are retained upon the tubular shaft in substantially the same manner except for the modified form of lock indicated at $16^b$. In this modification of our invention the grease is provided to the interior of the shaft $3^b$ by means of a grease fitting $30^b$ which is fitted to the end of the rigid tubular shaft $5^b$. In this modification of our invention we have illustrated the form of mounting the disks which includes two shafts which are mounted in the single frame $1^b$ in end to end relation, as is commonly utilized in disk harrow construction and have illustrated the fittings for the shafts or bearing mountings therefor to the frame $1^b$ at the adjacent ends of the two shafts. The fittings for the outer ends of the shafts are the same as those illustrated for the inner ends of the shafts.

In this modification of our invention above described the disks $2^b$ are locked to the spacer $6^b$ so as to cause the disks $2^b$ to rotate with the shaft $3^b$ in exactly the same manner as set forth in the previous modification of our invention described except that in this case the inner ends of the end spacing collar $6^b$ are made with an annular recess $11^b$ to receive the locking projection $10^b$ of the next adjacent spacing spool $6^b$.

Having fully described our invention, it is to be understood that we do not wish to be limited to the details herein set forth, but our invention is of the full scope of the appended claims.

We claim:

1. In a ground working tool, the combination of a tubular shaft, a fixed shaft concentrically positioned within the tubular shaft, a frame, bearing stops positioned within the tubular shaft and spaced from the ends thereof, a plurality of ground working elements, interlocking spaced elements mounted upon the tubular shaft having complementary engaging ends of non-circular form between which the ground working elements are secured, one of said elements being fixed to the tubular shaft at one end and clamping means secured to the shaft at the opposite end to lock the assembly of spacers and ground working elements to the tubular shaft, bearing means positioned within the tubular shaft at the respective ends thereof in engagement with the bearing stops, bearing adjustment collars threaded to the fixed shaft within the tubular shaft and providing frame-engaging means, means secured to the opposed ends of the fixed shaft for clamping the fixed shaft to the frame and to the collars, means for spraying lubricant to within the tubular shaft, and means at the ends of the tubular shaft for retaining the lubricant therein.

2. In a ground working tool, the combination of a tubular shaft, a fixed shaft concentrically positioned within the tubular shaft, spaced bearing stops positioned within the tubular shaft and spaced from the ends thereof, a plurality of ground working elements mounted upon the tubular shaft, bearing means positioned within the tubular shaft at the respective ends thereof in engagement with the bearing stops, and bearing adjustment collars threaded to the fixed shaft within the tubular shaft.

3. In a ground working tool, the combination of a frame, a tubular shaft, a fixed shaft, ground working elements mounted upon the tubular shaft, bearing elements interposed between the tubular shaft and the fixed shaft near the respective ends of the fixed shaft, stop means interposed between the tubular shaft and the fixed shaft to position the bearing means, and collar means threaded to the fixed shaft within the tubular shaft, and means carried upon the ends of the fixed shaft for clamping the frame to said collars.

4. In a ground working tool, the combination of a tubular shaft, a plurality of spaced disks mounted upon the tubular shaft, a fixed shaft concentrically positioned within the tubular shaft, bearings mounted at the opposed ends of the tubular shaft, stop means within the tubular shaft for holding the bearings in spaced relation, bearing adjustment collars threaded to the fixed shaft within the tubular shaft to engage the spaced bearings, and means for holding the collars in adjusted position.

5. In a ground working tool, the combination of a tubular shaft, a plurality of spaced disks mounted upon the tubular shaft, a fixed shaft concentrically positioned within the tubular shaft, bearings mounted at the opposed ends of the tubular shaft, stop means within the tubular shaft for holding the bearings in spaced relation, bearing adjustment collars threaded to the fixed shaft within the tubular shaft to engage the spaced bearings, means for holding the collars in adjusted position, and packing means carried by the collars within the tubular shaft to prevent foreign matter passing into the interior of the tubular shaft.

6. In a ground working implement, the combination of a frame, a tubular shaft, a fixed shaft concentrically positioned within the tubular shaft, a plurality of ground working disks mounted in spaced relation upon the tubular shafts, bearing means mounted at the opposed end of the tubular shaft to rotatably support the tubular shaft with relation to the fixed shaft, and bearing adjustment collars adjustably secured to the fixed shaft within the tubular shaft, and means for clamping the frame to the bearing adjustment collars.

7. In a ground working tool, the combination of a tubular shaft, a fixed shaft concentrically positioned within the tubular shaft, ground working disks mounted in spaced relation along the length of the tubular shaft, bearing stop rings secured to the tubular shaft within the interior thereof, sleeve bearing members mounted upon the fixed shaft in engagement with the stop members and rotatably supporting the tubular shaft upon the fixed shaft, and adjustment collars threaded to the opposed ends of the fixed shaft and extending within the tubular shaft into engagement with the ends of the sleeve bearings, and packing means interposed between the bearing adjustment collars and the tubular shaft within the tubular shaft to prevent the admission of foreign matter to the interior of the tubular shaft.

8. In a ground working tool, the combination of a tubular shaft, a fixed shaft mounted concentrically within the tubular shaft, spaced ground working disks mounted along the length of the tubular shaft, combined radial and end thrust roller bearings mounted upon the fixed shaft for rotatably supporting the tubular shaft with relation to the fixed shaft, and bearing adjustment collars threaded to the fixed shaft to adjust the position of the roller bearings upon the fixed shaft with relation to stops provided upon the tubular shaft, said adjustment collars extending into the tubular shaft, and packing means mounted upon the adjustment collars within the tubular shaft to prevent the admission of foreign matter into the interior of the tubular shaft.

ROLLIE H. MITCHELL.
OSCAR W. SJOGREN.
EDWIN F. WADELTON.